United States Patent [19]

Christiansen et al.

[11] Patent Number: 5,232,049

[45] Date of Patent: Aug. 3, 1993

[54] SEQUENTIALLY FLOODING A SUBTERRANEAN HYDROCARBON-BEARING FORMATION WITH A REPEATING CYCLE OF IMMISCIBLE DISPLACEMENT GASES

[75] Inventors: Richard L. Christiansen, Littleton; Sidney R. Smith, Lakewood, both of Colo.

[73] Assignee: Marathon Oil Company, Findlay, Ohio

[21] Appl. No.: 859,205

[22] Filed: Mar. 27, 1992

[51] Int. Cl.$^5$ .................. E21B 43/18; E21B 49/00
[52] U.S. Cl. .................... 166/252; 166/268; 166/273
[58] Field of Search ............... 166/252, 268, 273, 274

[56] References Cited

U.S. PATENT DOCUMENTS

| | | | |
|---|---|---|---|
| 2,822,872 | 2/1958 | Rzasa et al. | 166/273 |
| 2,968,350 | 1/1961 | Slobod et al. | 166/273 |
| 3,179,166 | 4/1965 | Sharp | 166/252 X |
| 3,249,157 | 5/1966 | Brigham et al. | 166/273 |
| 3,586,107 | 6/1971 | Parrish . | |
| 3,599,717 | 8/1971 | McMillen | 166/273 |
| 3,811,501 | 5/1974 | Burnett et al. . | |
| 3,811,502 | 5/1974 | Burnett et al. . | |
| 3,811,503 | 5/1974 | Burnett et al. . | |
| 3,841,403 | 10/1974 | Burnett et al. . | |
| 3,854,532 | 12/1974 | Braden, Jr. . | |
| 3,856,086 | 12/1974 | Braden, Jr. . | |
| 3,995,693 | 12/1976 | Cornelius | 166/268 |
| 4,022,278 | 5/1977 | Allen . | |
| 4,136,738 | 1/1979 | Haynes, Jr. et al. . | |
| 4,393,936 | 7/1983 | Josendal . | |
| 4,467,868 | 8/1984 | Adamache | 166/273 X |
| 4,617,996 | 10/1986 | Shu | 166/273 |
| 4,846,276 | 7/1989 | Haines . | |
| 5,025,863 | 6/1991 | Haines et al. . | |

Primary Examiner—George A. Suchfield
Attorney, Agent, or Firm—Jack L. Hummel; Jack E. Ebel

[57] ABSTRACT

A process is provided for recovering liquid hydrocarbons from a subterranean hydrocarbon-bearing formation by sequential injection of a pair of immiscible gases of differing composition which displace the liquid hydrocarbons from the formation. The compositions of the displacement gases are selected such that one gas is characterized as a swelling gas and the other is characterized as a non-swelling gas with respect to the liquid hydrocarbons in place.

17 Claims, No Drawings

SEQUENTIALLY FLOODING A SUBTERRANEAN HYDROCARBON-BEARING FORMATION WITH A REPEATING CYCLE OF IMMISCIBLE DISPLACEMENT GASES

FIELD OF THE INVENTION

The present invention relates to a process for the recovery of liquid hydrocarbons from a subterranean hydrocarbon-bearing formation, and more particularly to a liquid hydrocarbon recovery process enhanced by sequentially flooding the formation with a repeating cycle of immiscible displacement gases of differing composition.

BACKGROUND OF THE INVENTION

Enhanced oil recovery processes employing a multiple-contact miscible gas mechanism have been successfully applied in a number of oil-bearing reservoirs. However, many reservoirs are confined to immiscible techniques for technical and economic reasons. For example, some reservoirs are too shallow to allow gas injection at the high pressures needed for multiple-contact miscibility. The cost of compression facilities severely limits the feasibility of high pressure gas injection for most offshore reservoirs. Compression costs are also a factor in limiting the feasibility of miscible techniques for many on-shore reservoirs. Finally, in some locations gases of optimum composition for efficient oil recovery using miscible techniques are not available. Thus, there is great incentive for technology that will increase recovery efficiency of immiscible gas processes.

Oil displacement efficiency with immiscible gas is limited by the ability of the injected gas phase to penetrate pore throats. Ability of gas to penetrate pore throats depends on gas-oil interfacial tension and the gas-oil-rock contact angle. These effects are combined and expressed in the gas-oil capillary pressure relationships.

One approach to increasing oil recovery efficiency of an immiscible gas process is to reduce gas-oil interfacial tension. Gas-oil interfacial tension drops with increasing pressure for a gas-oil pair. In fact, gas-oil interfacial tension may drop so low that miscibility between the gas and oil actually develop after multiple contacting at sufficiently high pressures. Gas-oil interfacial tension also drops as gas is enriched with gaseous components having higher oil solubility.

As such, a number of fluid injection processes have been developed to capitalize on this approach. U.S. Pat. No. 4,842,065 to McClure injects sequential slugs of a liquid surfactant and water into an oil-bearing reservoir to alter the wettability of the reservoir rock and enhance oil recovery therefrom. U.S. Pat. No. 4,846,276 to Haines injects sequential slugs of water and an immiscible gas into an oil-bearing reservoir to enhance oil recovery therefrom.

Accordingly, it is an object of the present invention to provide a sequential injection process employing immiscible fluids which enhances oil recovery from a subterranean hydrocarbon-bearing formation. It is also an object of the present invention to provide such a process which is both simple and economic to operate at an increased oil recovery efficiency. It is further an object of the present invention to provide a gas injection process for increased oil recovery which can effectively utilize a number of different gas compositions as a function of availability.

SUMMARY OF THE INVENTION

The present invention is a process for recovering liquid hydrocarbons from a subterranean hydrocarbon-bearing formation by sequentially injecting a pair of two gases of differing composition which displaces the liquid hydrocarbons from the formation. The two displacement gases are placed in the formation under downhole conditions that render them uniformly immiscible in the liquid hydrocarbons residing therein. In addition, the compositions of the displacement gases are selected such that one gas is characterized as a swelling gas, i.e., causes the volume of the liquid hydrocarbons in place to increase upon contact therewith, and the other gas is characterized as a non-swelling gas, i.e., does not cause the volume of the liquid hydrocarbons in place to increase upon contact.

In the practice of the present process, a first stage is initiated by continuously injecting the non-swelling gas into the formation under immiscible conditions via an injection wellbore while fluid production from an associated production wellbore is simultaneously monitored. Continuous injection of the non-swelling gas continues until a predetermined control parameter at the production wellbore is satisfied. At that point injection of the non-swelling gas is ceased, terminating the first stage of the process.

Injection of the swelling gas into the injection wellbore under immiscible conditions is then commenced to initiate a second stage of the process. In a manner similar to the first stage, the swelling gas is continuously injected into the formation while fluid production is monitored. When the predetermined control parameter is satisfied, injection of the swelling gas is terminated, thereby completing one cycle of the process. This injection cycle is repeated thereafter any number of times in the same manner as recited above. Typically, the process is continued until no further liquid hydrocarbons can be economically recovered from the formation.

Although the process of the present invention has been described above as being initiated by the injection of the non-swelling gas, it is understood that the present process encompasses the sequential injection of the swelling and non-swelling gases in either order, i.e., the process can be initiated by injection of either the swelling gas or the non-swelling gas so long as the same order is maintained throughout the remainder of the process. It is further understood that each cycle of the present process can encompass the injection of three or more gases of differing composition in sequence so long as at least one of the displacement gases is a swelling gas.

The present liquid hydrocarbon recovery process employing sequential injection of immiscible displacement gases is particularly advantageous because it enables the recovery of significantly greater increments of liquid hydrocarbons than could be recovered by the conventional injection of a single immiscible displacement gas composition under the same injection conditions. Accordingly, liquid hydrocarbon recovery is improved in the present process while operating under immiscible conditions, thereby avoiding the high cost and process complexities of a miscible gas injection process.

DESCRIPTION OF PREFERRED EMBODIMENTS

The present invention relates to a process for recovering liquid hydrocarbons, typically oil, from a subterranean formation by sequentially injecting a plurality of immiscible displacement gases into the formation and cycling the gas injection sequence repeatedly until economic recovery of the liquid hydrocarbons from the formation is exhausted. The gas injection sequence is characterized in that at least one of the immiscible displacement gases is a swelling gas and at least one is a non-swelling gas.

The term "immiscible" denotes that the displacement gas injected into the formation does not develop miscibility with the oil in place. Although, a portion of the immiscible displacement gas may dissolve in the oil upon contact, a portion of the immiscible gas always remains out of solution in a distinct gas phase when the oil is contacted with the gas. By comparison, when the oil in place is contacted with a miscible gas, all of the gas goes into solution with the oil until the gas becomes saturated in the oil, i.e., no distinct gas phase exists prior to saturation.

A swelling gas is defined herein as a gas that causes the volume of oil in place to perceptibly increase upon gas-oil contacting under downhole process conditions of temperature and pressure although the gas is immiscible. Generally to be termed a swelling gas, the gas should be capable of bringing about at least a 2% increase in the volume of the oil upon contact therewith, and preferably at least about a 5% increase in the volume. Conversely, a non-swelling gas is a gas that causes the previously swelled oil to perceptibly decrease in volume upon contact between the swelling gas and oil under downhole process conditions. Thus, a non-swelling gas is generally one wherein the volume of the swelled oil decreases by no more than about 2% of its original unswelled volume upon contact with the gas, and preferably decreases by no more than about 1%.

The characterization of any particular gas composition as swelling or non-swelling is a function of the composition of the oil being contacted and the temperature and pressure conditions under which the oil is contacted. However, for the purposes of the present invention, certain gases have been found generally to be swelling gases with respect to most oils under immiscible downhole injection conditions typically encountered. These gases include carbon dioxide, ethane, carbon dioxide enriched with ethane, highly enriched methane, and various mixtures of these gases or other gases exhibiting favorable swelling characteristics. Highly enriched methane is defined as a mixture of methane and ethane, propane, butane or combinations thereof, wherein methane makes up no more than about 75 mole % of the mixture.

Certain other gases have been found generally to be non-swelling gases, with respect to most oils under immiscible downhole injection conditions encountered. These gases are alternatively termed shrinking gases, and include methane, nitrogen, natural gas, gas cap gas, flue gas, weakly enriched methane, and various mixtures of these gases or other gases exhibiting favorable non-swelling characteristics. Weakly enriched methane is defined as a mixture of methane with other enriching gases such as ethane, butane, or propane, wherein methane makes up more than about 75 mole % of the mixture. Natural gas comprises about 90% methane, flue gas comprises primarily nitrogen and carbon dioxide, while gas cap gas comprises primarily methane and nitrogen with a smaller fraction of carbon dioxide. Another potential swelling/non-swelling gas pair is a sweet/sour gas pair.

The process of the present invention can be applied to a relatively broad range of subterranean hydrocarbon-bearing formations varying in depth from relatively shallow formations, e.g., 300 meters or less, to relatively deep formations, e.g., 4,000 meters or more, and being at a pressure ranging from relatively high, e.g., 40,000 kPa or more, to relatively low, i.e., pressure depleted. The process can be applied to homogeneous or heterogeneous sandstone or carbonate formations. The formation can contain liquid hydrocarbons ranging in density from light to heavy oils, the formation can be in a saturated or undersaturated condition, and the formation can contain mobile or immobile water. The process of the present invention can be applied as a primary, secondary, or tertiary recovery process or as an augment to any one of these processes.

The present process utilizes one or more injection wellbores in fluid communication with the hydrocarbon-bearing formation and one or more production wellbores spaced away from the injection wellbores, and likewise in fluid communication with the hydrocarbon-bearing formation. The process is initiated by commencing the first injection stage, wherein the non-swelling gas is continuously injected into at least one injection wellbore at a sufficient injection pressure enabling the gas to penetrate the formation, yet at a pressure both below the formation parting pressure and below the minimum miscibility pressure of the gas in the oil. In a fractured formation having a gas cap, the non-swelling gas is preferably injected directly into the gas cap and distributed through the formation via the fracture network.

The temperature of the non-swelling gas is preferably ambient temperature, but can vary from as low as the gas liquefaction temperature to in excess of the formation temperature, depending on the available source of the gas and the heat of compression generated in pressurizing the gas. In any event, the temperature of the injected non-swelling gas is not sufficient to render the gas miscible in the oil in place, nor preferably is the temperature sufficient to significantly mobilize the liquid hydrocarbon in the manner of a thermal recovery process.

The non-swelling gas is injected continuously into the formation while fluid production at the one or more production wellbores is monitored. Gas injection proceeds until one, or a combination, of any number of predetermined control parameters selected by the operator is satisfied. Among the control parameters available to the operator are the instantaneous and cumulative levels of oil production, the instantaneous and cumulative rates of oil production, the cumulative volume of injected displacement gas, the degree of displacement gas saturation in the oil in place, and the composition of gas produced from the production wellbore. Thus, the first injection stage may be terminated under such conditions as when oil production falls off by a predetermined percentage, oil production falls off to a predetermined level, a predetermined volume of the non-swelling gas is injected into the formation, the gas saturation level of the oil in place achieves a predetermined value, or the composition of produced gas corresponds to the composition of the displacement gas.

In a preferred embodiment, the first injection stage is terminated when the instantaneous oil production level goes to zero. Although at least some quantity of oil is almost always produced in the first injection stage of the non-swelling gas, in the event that no oil is produced, injection of the non-swelling gas proceeds until a predetermined volume of the non-swelling gas is injected or until a gas is produced from the production wellbores having a substantially identical composition to the displacement gas. The predetermined volume of non-swelling gas injected may be as high as 400 to 500% or more of the hydrocarbon pore volume. More preferably though, due to time constraints, the predetermined volume is usually between about 2 and 100% of the hydrocarbon pore volume, and most preferably between about 2 and 20% of the hydrocarbon pore volume.

In an alternate embodiment, the first injection stage is terminated when the gas saturation level of the oil in place reaches a maximum. In most cases, this condition would be detectable by a correspondence between the composition of the produced gas and the composition of the displacement gas.

Upon termination of the first injection stage, the second injection stage is commenced, wherein a swelling gas is continuously injected into at least one of the injection wellbores. The temperature and pressure conditions for the second injection stage are preferably substantially the same as for the first injection stage, although in some instances it may be necessary to make some adjustments thereto in order to insure that the swelling gas is maintained under immiscible conditions downhole.

It is preferred that the second injection stage be commenced immediately after termination of the first injection stage such that there is substantially no interruption in gas injection when transitioning between the first and second stages, but simply a change in the composition of the gas injected. Termination of the second stage is preferably determined according to substantially the same criteria as the first stage which are recited above.

Termination of the second stage completes one cycle of the process. The same injection cycle is then repeated by recommencing injection of the non-swelling gas according to the manner of the first injection stage as recited above. The injection cycle may be repeated any number of times without interruption such that gas injection is continuous throughout the process. It has been found that the process of the present invention is generally most advantageous when the injection cycle is performed at least three or more times.

Each repetition of the cycle repeats the same gas injection sequence as the first cycle, although specific injection conditions may be adjusted from cycle to cycle in accordance with fluid production data monitored at the production wellbore throughout the process. The entire process is preferably terminated when the last completed cycle fails to result in the economic recovery of oil from the formation.

The present process further encompasses an alternative injection cycle wherein the gas compositions of the stages are reversed relative to the cycle described above such that the first injection stage is made up of a swelling gas and the second injection stage is made up of a non-swelling gas. This injection sequence is then maintained for the remainder of the process through any number of cycles.

The injection cycle as contemplated by the present invention can also encompass three or more stages, so long as at least two different gas compositions are utilized in the cycle and at least one of the gas compositions is a swelling gas while at least one of the others is a non-swelling gas. It is further preferable that the stages are sequenced such that each adjacent stage employs a gas composition imparting a different expansion characteristic to the oil in place than the gas composition of the immediately preceding or subsequent stage. In other words, each stage of the injection sequence should be followed by a stage employing a gas that alters the volume of the oil in place relative to lo the gas of the previous stage, either swelling or shrinking the oil. In the most preferred embodiment, each of the stages employs a different gas composition than the other stages.

Although it is not known, and the present invention is not so limited, it is believed that the process operates according to a mechanism, whereby alternate swelling and shrinking of the oil in place forces free gas into pores that would otherwise be impenetrable by an immiscible gas. Specifically, after transitioning from injection of the swelling gas to injection of the non-swelling gas, the volume of oil in the pore spaces of the formation rock gradually shrinks as the swelling gas that is dissolved in the oil is replaced by non-swelling gas.

When the volume of the oil in place shrinks upon contact with the non-swelling gas, undissolved displacement gas is forced into pore spaces that could not have otherwise been penetrated by a gas employed in a conventional constant composition immiscible injection process. After transitioning from injection of the non-swelling gas back to injection of the swelling gas, the oil volume gradually swells again, thereby producing a volume of incremental oil from the formation that is substantially equal to the volume of gas forced into the pore spaces in the previous injection stage.

The following examples demonstrate the practice and utility of the present invention but are not to be construed as limiting the scope thereof.

EXAMPLE 1

A core sample from a subterranean hydrocarbon-bearing formation is prepared having a length of 7.0 cm and a diameter of 8.9 cm. The permeability of the core sample is about 270 md and the pore volume is 83.8 cm$^3$ based on a porosity of 0.19. Water saturation of the core sample is 0.6 ml.

The core sample is flushed with a separator oil and then saturated with the separator oil at 1380 kPa backpressure. The process of the present invention is then performed on the saturated core, wherein two different gas compositions are sequentially injected therein. The non swelling gas is a gas cap gas GCG) and the swelling gas is carbon dioxide ($CO_2$). The injection conditions are maintained at a temperature of 27.8° C. and a pressure of 3200 kPa.

Injection of the respective gases proceeds at each stage until the instantaneous level of oil production falls to zero. If no oil is produced during the stage, injection of the respective gas continues until a predetermined number of hydrocarbon pore volumes of the displacement gas are injected through the core. The process is then transitioned to the next stage. The oil recovery data for this example are set forth below in Table 1.

TABLE 1

| Stage | Gas | Cycle | Oil Recovery (g) |
| --- | --- | --- | --- |
| 1 | GCG | 1 | 11.5 |
| 2 | $CO_2$ | 1 | 2.3 |
| 3 | GCG | 2 | 0.3 |
| 4 | $CO_2$ | 2 | 1.7 |
| 5 | GCG | 3 | 0.4 |
| 6 | $CO_2$ | 3 | 0.8 |
| 7 | GCG | 4 | 0.0 |
| 8 | $CO_2$ | 4 | 0.9 |

EXAMPLE 2

The core sample described above is flushed and resaturated with the same separator oil as Example 1, but at a backpressure of 2070 kPa. The process of the invention is then performed on the saturated core in a similar manner to Example 1 using the same displacement gases. The oil recovery data for this example are set forth below in Table 2.

TABLE 2

| Stage | Gas | Volume (cm$^3$) | Cycle | Oil Recovery (g) |
| --- | --- | --- | --- | --- |
| 1 | GCG | 378 | 1 | 13.5 |
| 2 | $CO_2$ | 876 | 1 | 3.6 |
| 3 | GCG | 738 | 2 | 0.0 |
| 4 | $CO_2$ | 784 | 2 | 1.3 |
| 5 | GCG | 520 | 3 | 0.1 |
| 6 | $CO_2$ | 654 | 3 | 1.1 |
| 7 | GCG | 452 | 4 | 0.0 |
| 8 | $CO_2$ | 720 | 4 | 0.5 |

During stage 5, the produced gas is analyzed and determined to have a $CO_2$ content of 7.5%, whereas the $CO_2$ content of the gas cap gas is only 5%. This suggests that oil shrinkage is attributable to the dissolution of swelling gas from the oil in place.

EXAMPLE 3

The procedure of Example 2 is repeated in the present example except that the gas compositions are modified by selecting ethane as the swelling gas and the following gas mixture (mole % basis) as the non-swelling gas:
nitrogen 15.0%
ethane 5.03%
propane 1.99%
methane 77.98%

The oil recovery data for this example are set forth below in Table 3. It is noted that ethane is so effective as a swelling gas that virtually all of the displacable oil is recovered from the core sample in the first cycle.

TABLE 3

| Stage | Gas | Volume (cm$^3$) | Cycle | Oil Recovery (g) |
| --- | --- | --- | --- | --- |
| 1 | mix | 1218 | 1 | 15.05 |
| 2 | ethane | 1508 | 1 | 20.13 |
| 3 | mix | 804 | 2 | 0.0 |
| 4 | ethane | 874 | 2 | 1.77 |
| 5 | mix | 572 | 3 | 0.0 |

EXAMPLE 4

The procedure of Example 3 is repeated in the present example except that the core sample is resaturated at a backpressure of 3240 kPa and a new core sample is utilized having substantially the same properties as the core sample of Example 1. The gas compositions are also modified by selecting three distinct gases for sequential injection, i.e, gas cap gas, a gas mixture #1 and a gas mixture #2. The compositions of gas mixtures #1 and #2 are as follows:

| gas mixture #1 | gas mixture #2 |
| --- | --- |
| nitrogen 15% | ammonia 1.04% |
| ethane 5% | nitrogen 15.00% |
| propane 1% | ethane 4.90% |
| methane 79% | propane 0.99% |
|  | methane 78.07% |

The oil recovery data for this example are set forth below in Table 4. This sequence of gas injection does not result in effective oil recovery by comparison with the Examples 1–3 because no repeating cycle is established and no swelling gas is employed.

TABLE 4

| Stage | Gas | Volume (cm$^3$) | Oil Recovery (g) |
| --- | --- | --- | --- |
| 1 | GCG | 588 | 23.4 |
| 2 | mix 1 | 648 | 0.0 |
| 3 | GCG | 496 | 0.0 |
| 4 | mix 2 | 514 | 0.0 |
| 5 | mix 1 | 70 | 0.0 |
| 6 | GCG | 348 | 0.0 |

EXAMPLE 5

The procedure of Example using the same core sample is repeated in the present example except that the gas compositions are modified by selecting carbon dioxide as the swelling gas and the following gas mixture A (mole basis) as the non-swelling gas:
carbon dioxide 5.0%
hydrogen sulfide 1.0%
nitrogen 14.0%
methane 77.0%
ethane 2.0%
propane 1.0%

The oil recovery data for this example are set forth below in Table 5.

TABLE 5

| Stage | Gas | Volume (cm$^3$) | Cycle | Oil Recovery (g) |
| --- | --- | --- | --- | --- |
| 1 | mix A | 4.5 | 1 | 19.3 |
| 2 | $CO_2$ | 10.4 | 1 | 5.2 |
| 3 | mix A | 8.8 | 2 | 0.0 |
| 4 | $CO_2$ | 9.3 | 2 | 2.0 |
| 5 | mix A | 6.2 | 3 | 0.1 |
| 6 | $CO_2$ | 7.8 | 3 | 1.6 |
| 7 | mix A | 5.4 | 4 | 0.0 |
| 8 | $CO_2$ | 8.6 | 4 | 0.7 |

EXAMPLE 6

The procedure of Example using the same core sample is repeated in the present example except that the gas compositions are modified by selecting ethane as the swelling gas and the following gas mixture B (mole % basis) as the non-swelling gas:
nitrogen 15.0%
methane 78.0%
ethane 5.0%
propane 2.0%

The oil recovery data for this example are set forth below in Table 6.

TABLE 6

| Stage | Gas | Volume (cm³) | Cycle | Oil Recovery (g) |
|---|---|---|---|---|
| 1 | mix B | 14.5 | 1 | 22.2 |
| 2 | ethane | 18.0 | 1 | 28.8 |
| 3 | mix B | 9.6 | 2 | 0.0 |
| 4 | ethane | 10.4 | 2 | 2.6 |

While the foregoing preferred embodiments of the invention have been described and shown, it is understood that the alternatives and modifications, such as those suggested and others, may be made thereto and fall within the scope of the invention.

We claim:

1. A process for recovering liquid hydrocarbons from a subterranean hydrocarbon-bearing formation comprising the steps of:
   a) injecting a first gas into said formation to substantially swell said liquid hydrocarbons contained therein, wherein said first gas is substantially immiscible in said liquid hydrocarbons;
   b) injecting a second gas into said formation to substantially shrink said liquid hydrocarbons contained therein, wherein said second gas is substantially immiscible in said liquid hydrocarbons;
   c) producing a portion of said liquid hydrocarbons from said formation, wherein steps a, b, and c constitute one cycle of said process; and
   d) repeating said cycle of said process.

2. A process for recovering liquid hydrocarbons from a subterranean hydrocarbon-bearing formation as claimed in claim wherein step b is performed sequentially after step a in said cycle.

3. A process for recovering liquid hydrocarbons from a subterranean hydrocarbon-bearing formation as claimed in claim wherein step a is performed sequentially after step b in said cycle.

4. A process for recovering liquid hydrocarbons from a subterranean hydrocarbon-bearing formation as claimed in claim 1 wherein step c is performed concurrently with step a or step b in said cycle.

5. A process for recovering liquid hydrocarbons from a subterranean hydrocarbon-bearing formation as claimed in claim 1 wherein said first gas is selected from the group consisting of carbon dioxide, ethane, carbon dioxide enriched with ethane, and highly enriched methane.

6. A process for recovering liquid hydrocarbons from a subterranean hydrocarbon-bearing formation as claimed in claim 1 wherein said second gas is selected from the group consisting of methane, nitrogen, natural gas, flue gas, gas cap gas, and weakly enriched methane.

7. A process for recovering liquid hydrocarbons from a subterranean hydrocarbon-bearing formation as claimed in claim 1 wherein step a is terminated when said first gas reaches maximum saturation in said liquid hydrocarbons.

8. A process for recovering liquid hydrocarbons from a subterranean hydrocarbon-bearing formation as claimed in claim 1 wherein step b is terminated when said second gas reaches maximum saturation in said liquid hydrocarbons.

9. A process for recovering liquid hydrocarbons from a subterranean hydrocarbon-bearing formation as claimed in claim 1 wherein step b is terminated when said first gas reaches minimum saturation in said liquid hydrocarbons.

10. A process for recovering liquid hydrocarbons from a subterranean hydrocarbon-bearing formation as claimed in claim 1 wherein step a is terminated when production of said liquid hydrocarbons from said formation ceases.

11. A process for recovering liquid hydrocarbons from a subterranean hydrocarbon-bearing formation as claimed in claim 1 wherein step b is terminated when production of said liquid hydrocarbons from said formation ceases.

12. A process for recovering liquid hydrocarbons from a subterranean hydrocarbon-bearing formation as claimed in claim 1 wherein step a is terminated when a production gas is produced from said formation having substantially the same composition as said first gas.

13. A process for recovering liquid hydrocarbons from a subterranean hydrocarbon-bearing formation as claimed in claim 1 wherein step b is terminated when a production gas is produced from said formation having substantially the same composition as said second gas.

14. A process for recovering liquid hydrocarbons from a subterranean hydrocarbon-bearing formation comprising the steps of:
   a) injecting a first gas into said formation to substantially swell said liquid hydrocarbons contained therein, wherein said first gas is substantially immiscible in said liquid hydrocarbons and is selected from the group consisting of carbon dioxide, ethane, carbon dioxide enriched with ethane, and highly enriched methane.
   b) injecting a second gas into said formation to substantially shrink said liquid hydrocarbons contained therein, wherein said second gas is substantially immiscible in said liquid hydrocarbons and is selected from the group consisting of methane, nitrogen, natural gas, flue gas, gas cap gas, and weakly enriched methane.
   c) producing a portion of said liquid hydrocarbons from said formation, wherein steps a, b, and c constitute one cycle of said process; and
   d) repeating said cycle of said process.

15. A process for recovering liquid hydrocarbons from a subterranean hydrocarbon-bearing formation as claimed in claim 14 wherein step b is performed sequentially after step a in said cycle.

16. A process for recovering liquid hydrocarbons from a subterranean hydrocarbon-bearing formation as claimed in claim 14 wherein step a is performed sequentially after step b in said cycle.

17. A process for recovering liquid hydrocarbons from a subterranean hydrocarbon-bearing formation as claimed in claim 14 wherein step c is performed concurrently with step a or step b in said cycle.

* * * * *

UNITED STATES PATENT AND TRADEMARK OFFICE
CERTIFICATE OF CORRECTION

PATENT NO. : 5,232,049

DATED : August 3, 1993

INVENTOR(S) : R. L. Christiansen et al.

It is certified that error appears in the above-identified patent and that said Letters Patent is hereby corrected as shown below:

Col. 6, line 13:   After "relative to" delete -- lo --.
Col. 8, line 31:   After "The procedure of Example" insert --1 --.
Col. 8, line 35:   Delete "(mole basis)" and insert -- (mole % basis) --.
Col. 8, line 58:   After "The procedure of Example" insert --1 --.
Col. 9, line 33:   After "claimed in claim" insert -- 1 --.
Col. 9, line 37:   After "claimed in claim" insert -- 1 --.

Signed and Sealed this

First Day of March, 1994

Attest:

Attesting Officer

BRUCE LEHMAN
Commissioner of Patents and Trademarks